(12) United States Patent
Shen

(10) Patent No.: US 9,094,143 B2
(45) Date of Patent: Jul. 28, 2015

(54) METHOD AND APPARATUS FOR PROCESSING BASEBAND UPLINK AND DOWNLINK SUB-FRAMES

(75) Inventor: Chengke Shen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 130 days.

(21) Appl. No.: 14/000,066

(22) PCT Filed: Jun. 14, 2011

(86) PCT No.: PCT/CN2011/075709
§ 371 (c)(1),
(2), (4) Date: Aug. 19, 2013

(87) PCT Pub. No.: WO2012/109833
PCT Pub. Date: Aug. 23, 2012

(65) Prior Publication Data
US 2013/0322306 A1    Dec. 5, 2013

(30) Foreign Application Priority Data
Feb. 17, 2011   (CN) .......................... 2011 1 0041015

(51) Int. Cl.
*H04J 3/00* (2006.01)
*H04J 3/16* (2006.01)
(Continued)

(52) U.S. Cl.
CPC ............ *H04J 3/1694* (2013.01); *H04W 28/06* (2013.01); *H04B 1/56* (2013.01); *H04W 88/08* (2013.01)

(58) Field of Classification Search
CPC ........................................................ H04B 1/56
USPC ........................................................ 370/280
See application file for complete search history.

(56) References Cited

U.S. PATENT DOCUMENTS

| 6,745,013 B1 * | 6/2004 | Porter et al. .................... 455/69 |
| 2002/0080816 A1 | 6/2002 | Spinar |

(Continued)

FOREIGN PATENT DOCUMENTS

| CN | 101197615 A | 6/2008 |
| CN | 101841906 A | 9/2010 |

(Continued)

OTHER PUBLICATIONS

International Search Report in international application No. PCT/CN2011/075709, mailed on Nov. 24, 2011.

(Continued)

*Primary Examiner* — Christopher R Crompton
(74) *Attorney, Agent, or Firm* — Oppedahl Patent Law Firm LLC

(57) ABSTRACT

The present disclosure provides a method and an apparatus for processing baseband uplink and downlink sub-frames. The method is for serial processing of uplink sub-frames and downlink sub-frames at a base station side of an LTE-TDD system, wherein a length of time slots for processing each sub-frame meets formulae $$\begin{cases} 3x + 2y + T_{L2} \leq 5.0 \text{ ms} \\ 2x + y \leq 4 - 2T_a - T_d. \end{cases}$$

By serial processing of the uplink and downlink sub-frames according to the present invention, more abundant processing time may be obtained. In other words, the baseband processor can operate at a lower speed, thus reducing an idle rate of the baseband processor and improving a resource utilization of the processor.

5 Claims, 2 Drawing Sheets

(51) Int. Cl.
*H04W 28/06* (2009.01)
*H04B 1/56* (2006.01)
*H04W 88/08* (2009.01)

(56) References Cited

U.S. PATENT DOCUMENTS

| | | |
|---|---|---|
| 2006/0146863 A1 | 7/2006 | Spinar |
| 2008/0232342 A1* | 9/2008 | Spinar et al. .............. 370/346 |
| 2008/0232391 A1 | 9/2008 | Spinar et al. |
| 2009/0168802 A1 | 7/2009 | Spinar et al. |
| 2009/0175235 A1 | 7/2009 | Spinar et al. |
| 2009/0207795 A1 | 8/2009 | Spinar et al. |
| 2010/0157928 A1 | 6/2010 | Spinar et al. |
| 2011/0211503 A1* | 9/2011 | Che et al. .................. 370/280 |
| 2011/0249645 A1 | 10/2011 | Spinar et al. |
| 2012/0026873 A1 | 2/2012 | Spinar |
| 2012/0033633 A1 | 2/2012 | Spinar |
| 2012/0033634 A1 | 2/2012 | Spinar |

FOREIGN PATENT DOCUMENTS

| | | |
|---|---|---|
| WO | 2010049587 A1 | 5/2010 |
| WO | 2010077120 A2 | 7/2010 |

OTHER PUBLICATIONS

English Translation of the Written Opinion of the International Search Authority in international application No. PCT/CN2011/075709, mailed on Nov. 24, 2011.
TD-LTE is a New Driving Force for Wireless City Development Jul. 2009.
Supplementary European Search Report in European application No. 11858994.4, mailed on May 8, 2014.

* cited by examiner

METHOD AND APPARATUS FOR PROCESSING BASEBAND UPLINK AND DOWNLINK SUB-FRAMES

TECHNICAL FIELD

The present disclosure relates to Long Term Evolution-Time Division Duplex (LTE-TDD) base station system techniques, and in particular to a method and apparatus for processing baseband uplink and downlink sub-frames at an LTE-TDD base station side.

BACKGROUND

In an LTE-TDD system, time slots of uplink and downlink sub-frames of a Physical Uplink Shared Channel (PUSCH) and a Physical Downlink Shared Channel (PDSCH) are arranged in serial. During implementation of an LTE-TDD base station, as the uplink and downlink PUSCH and PDSCH sub-frames are arranged in serial in time, parallel processing at the uplink and downlink, namely, processing the sub-frames according to an order of sub-frames 0, 1, 2, . . . 9, often leads to an excessively high idle rate of a baseband processor, thus reducing a resource utilization of the processor.

In order to improve the resource utilization of the processor, the present disclosure adopts a solution of serial processing of the uplink and downlink sub-frames with a same processor (or processor array). For this solution, the method for length allocation and the best arrangement of time slots for processing the uplink and downlink sub-frames in the worst case is given. Relative to the uplink and downlink parallel method, such a serial method may obtain more abundant processing time. In other words, the baseband processor only needs a lower speed.

SUMMARY

In view of the above, the main objective of the disclosure is to provide a method and apparatus for processing baseband uplink and downlink sub-frames capable of reducing the idle rate of the baseband processor, thereby improving the resource utilization of the processor.

To achieve this objective, the technical solution of the present disclosure is implemented as follows:

A method for processing baseband uplink and downlink sub-frames, includes:

serially processing uplink sub-frames and downlink sub-frames at a base station side of a Long Term Evolution-Time Division Duplex (LTE-TDD) system, wherein a length of time slots for processing each sub-frame meets formulae $$\begin{cases} 3x + 2y + T_{L2} \le 5.0 \text{ ms} \\ 2x + y \le 4 - 2T_a - T_d, \end{cases}$$

wherein $T_a$ is a delay in transmission from a designated receiving antenna to a baseband processor, $T_d$ is a delay in initiating baseband sub-frame processing, $T_{L2}$ is a time reserved for MAC layer processing, x represents an allowable length of time slots for processing an uplink sub-frame, and y represents an allowable length of time slots for processing a downlink sub-frame.

An order of processing arrangement in the serially processing uplink sub-frames and downlink sub-frames may be: a sub-frame 2 of a current frame, a sub-frame 3 of the current frame, a sub-frame 6 of the current frame, a sub-frame 4 of the current frame, a sub-frame 0 of a next frame, a sub-frame 7 of the current frame, a sub-frame 8 of the current frame, a sub-frame 1 of the next frame, a sub-frame 9 of the current frame, and a sub-frame 5 of the next frame, wherein a reserved time slot with a length of at least $T_{L2}$ may be inserted between the sub-frame 4 of the current frame and the sub-frame 0 of the next frame, and the reserved time slot with a length of at least $T_{L2}$ may be inserted between the sub-frame 9 of the current frame and the sub-frame 5 of the next frame The sub-frame 2, the sub-frame 3, the sub-frame 4, the sub-frame 7, the sub-frame 8, and the sub-frame 9 may be the uplink sub-frames;

the sub-frame 0, the sub-frame 1, the sub-frame 5, and the sub-frame 6 may be the downlink sub-frames; and the sub-frame 1 and the sub-frame 6 may be special sub-frames.

An apparatus for processing baseband uplink and downlink sub-frames, includes at least a serial processing module configured to serially process uplink sub-frames and downlink sub-frames, wherein a length of time slots for processing each sub-frame meets formulae $$\begin{cases} 3x + 2y + T_{L2} \le 5.0 \text{ ms} \\ 2x + y \le 4 - 2T_a - T_d, \end{cases}$$

wherein $T_a$ is a delay in transmission from a designated receiving antenna to a baseband processor, $T_d$ is a delay in initiating baseband sub-frame processing, $T_{L2}$ is a time reserved for MAC layer processing, x represents an allowable length of time slots for processing an uplink sub-frame, and y represents an allowable length of time slots for processing a downlink sub-frame.

An order of processing arrangement in serial processing of the uplink sub-frames and the downlink sub-frames may be: a sub-frame 2 of a current frame, a sub-frame 3 of the current frame, a sub-frame 6 of the current frame, a sub-frame 4 of the current frame, a sub-frame 0 of a next frame, a sub-frame 7 of the current frame, a sub-frame 8 of the current frame, a sub-frame 1 of the next frame, a sub-frame 9 of the current frame, and a sub-frame 5 of the next frame, wherein a reserved time slot with a length of at least $T_{L2}$ may be inserted between an uplink sub-frame 4 of the current frame and a downlink sub-frame 0 of the next frame, and the reserved time slot with a length of at least $T_{L2}$ may be inserted between an uplink sub-frame 9 of the current frame and a downlink sub-frame 5 of the next frame.

According to the above technical solution provided by the present disclosure, the uplink and downlink sub-frames are processed in serial, and the length of the time slots for processing each sub-frame meets the requirement shown in formula (3). Preferably, the order of arranging the processing of the uplink and downlink sub-frames is: sub-frame 2 of the current frame, sub-frame 3 of the current frame, sub-frame 6 (sub-frame S) of the current frame, sub-frame 4 of the current frame, sub-frame 0 of the next frame, sub-frame 7 of the current frame, sub-frame 8 of the current frame, sub-frame 2 (sub-frame S) of the next frame, sub-frame 9 of the current frame and sub-frame 5 of the next frame, wherein a reserved time slot with a length of at least $T_{L2}$ is inserted between uplink sub-frame 4 (or 9) and downlink sub-frame 0 (or 5) of the next frame. With the method of serial processing of the uplink and downlink sub-frames of the present disclosure, more abundant processing time is obtained. In other words, only a lower speed is required for the baseband processor, thus reducing the idle rate of the baseband processor and improving the resource utilization of the processor.

DETAILED DESCRIPTION

As the time slots of the uplink and downlink sub-frames of the PUSCH and PDSCH are arranged in serial, it is possible to serially process the uplink and downlink with the same processor. With the uplink and downlink serial processing, it is possible to improve the utilization of the processor and decrease an idling rate, thus lowering the cost of implementing a base station system.

Figure 1:
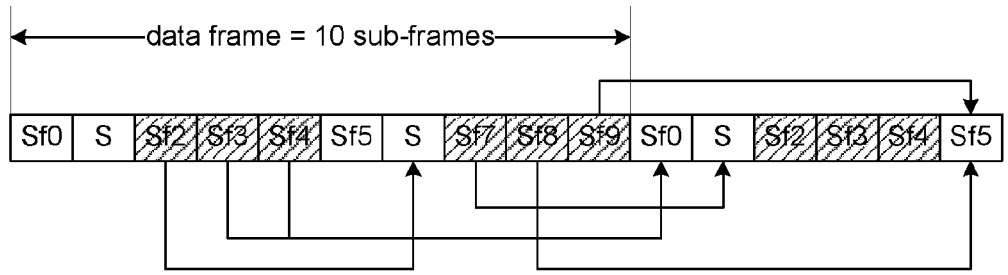
FIG. 1 is the schematic diagram of the issuance of the uplink and downlink sub-frames of an existing LTE-TDD configuration 0.

Those skilled in the art know that in seven different configurations of the LTE-TDD, the worst case occurs at configuration 0. FIG. 1 is the schematic diagram of the issuance of the uplink and downlink sub-frames of the existing LTE-TDD configuration 0. In FIG. 1, blank sub-frames represent the downlink, while shaded sub-frames represent the uplink. Sub-frame S represents a special sub-frame; arrows indicated that information solved from corresponding uplink sub-frames must be sent back to a downlink channel at the downlink sub-frames directed by the arrows. As shown in FIG. 1, in the case of configuration 0, there are totally six uplink sub-frames and four downlink sub-frames that go through an analysis of arrangement and combination of various different processing time slots under designated parameters such as channel transmission delay $T_a$, delay in initiating baseband sub-frame processing $T_d$ and time reserved for MAC layer processing $T_{L2}$ and the like.

Figure 2:
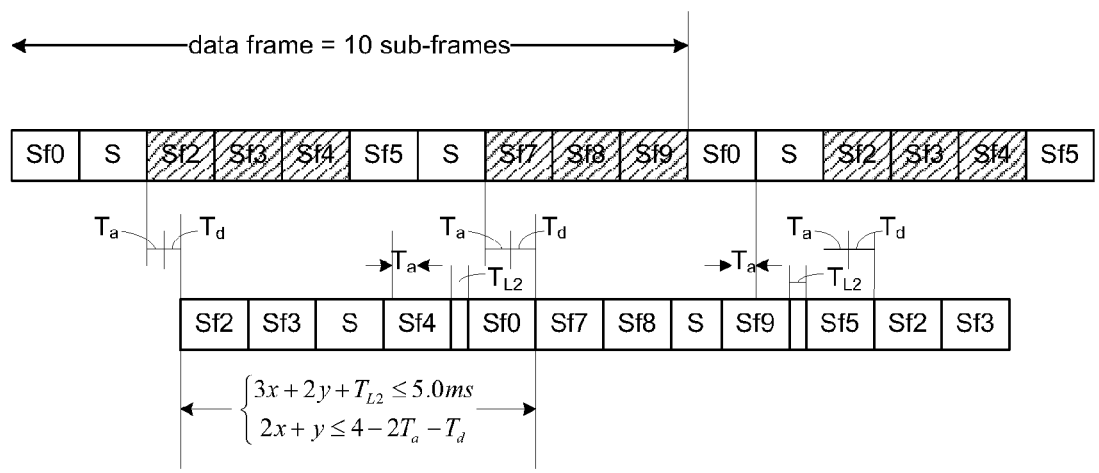
FIG. 2 is the schematic diagram of the uplink and downlink sub-frames and the constraint on a temporal order of the time slots for processing the uplink and downlink sub-frames according to the present disclosure.

FIG. 2 is the schematic diagram of the uplink and downlink sub-frames and the constraint on a temporal order of the time slots for processing the uplink and downlink sub-frames according to the present disclosure. In FIG. 2, line 1 is the schematic diagram of the issuance of sub-frames of configuration 0, line 2 is the schematic diagram of the time slots for processing the sub-frames by the processor. Parameters such as a delay in transmission from a receiving antenna to a baseband processor $T_a$, delay in initiating baseband sub-frame processing $T_d$, time reserved for MAC layer processing $T_{L2}$, and the like are given in a rhombic frame.

First, as shown in FIG. 2, processing of three uplink sub-frames and two downlink sub-frames, i.e. uplink sub-frame 2 of a current frame, uplink sub-frame 3 of the current frame, uplink sub-frame 4 of the current frame, special downlink sub-frame 6 of the current frame (sub-frame S), downlink sub-frame 0 of a next frame, and an interval $T_{L2}$ must be completed within half of a data frame, i.e. 5 ms, which leads to formula (1):

$$3x+2y+T_{L2} \le 5.0 \text{ ms} \qquad (1)$$

wherein x represents an allowable length of time slots for processing the uplink sub-frame, and y represents an allowable length of time slots for processing the downlink sub-frame.

Then, it may be known from the special sub-frame S that, as downlink channel transmission delay Ta and the time slots for processing sub-frame S must be completed Ta before the sending of the downlink sub-frame S, formula (2) thus holds:

$$2x+y \le 4-2T_a-T_d \qquad (2)$$

By combining formula (1) and formula (2), a limiting condition equation of the time slots for uplink and downlink processing is obtained as shown in formula (3):

$$\begin{cases} 3x + 2y + T_{L2} \le 5.0 \text{ ms} \\ 2x + y \le 4 - 2T_a - T_d \end{cases} \qquad (3)$$

Figure 3:
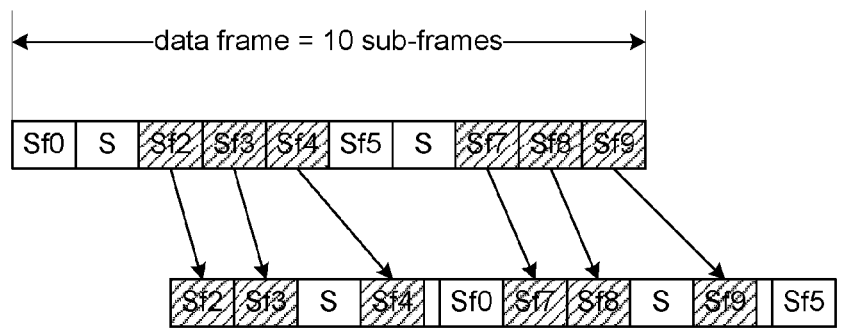
FIG. 3 is the schematic diagram of the order in processing the uplink sub-frames according to the present disclosure.
Figure 4:
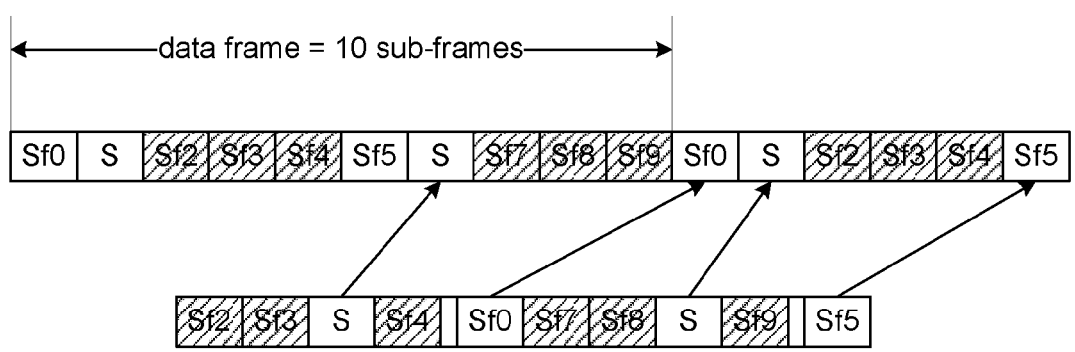
FIG. 4 is the schematic diagram of the order in processing the downlink sub-frames according to the present disclosure.

Analyzing from FIG. 2, it is clear that, instead of processing sub-frames 0, 1, 2, . . . , 9 according to an existing order therein, the present disclosure processes the sub-frames according to the order of the uplink and downlink sub-frames 2, 3, 6, 4, 0, 7, 8, 1, 9, 5, which is the optimal order. It is easy for those skilled in the art to know that there are a lot of suboptimal orders which will not be enumerated herein. FIG. 3 is the schematic diagram of the order in processing the uplink sub-frames according to the present disclosure. FIG. 4 is the schematic diagram of the order in processing the downlink sub-frames according to the present disclosure. The orders in processing the sub-frames shown in FIG. 3 and FIG. 4 are derived based on the analysis of FIG. 2. In FIG. 3 and FIG. 4, the uplink sub-frames are processed according to the order of 2, 3, 4, 7, 8, 9. The special sub-frame 6 (or sub-frame S) is processed between sub-frame 3 and sub-frame 4; the downlink sub-frame 0 of the next data frame is processed between sub-frame 4 and sub-frame 7; the special sub-frame 1 (sub-frame S) of the next data frame is processed between sub-frame 8 and sub-frame 9; and the downlink sub-frame 5 of the next data frame is processed at last. As a signal (if any) solved from the uplink sub-frame 4 (or sub-frame 9) must be sent back at the downlink sub-frame 0 (or sub-frame 5), thus a time slot of a length of at least $T_{L2}$, i.e. reserved time slot, must be inserted between the two sub-frames 4 (or 9) and 0 (or 5).

To sum up, the method for processing baseband uplink and downlink sub-frames according to the present disclosure comprises: serially processing the uplink and downlink sub-frames, wherein the length of the time slots for processing each sub-frame meets the requirement shown in formula (3). Preferably, the order of arranging the processing of the uplink and downlink sub-frames is: a sub-frame 2 of a current frame, a sub-frame 3 of the current frame, a sub-frame 6 of the current frame, a sub-frame 4 of the current frame, a sub-frame 0 of a next frame, a sub-frame 7 of the current frame, a sub-frame 8 of the current frame, a sub-frame 1 of the next frame, a sub-frame 9 of the current frame, and a sub-frame 5 of the next frame, wherein a reserved time slot with a length of at least $T_{L2}$ is inserted between uplink sub-frame 4 (or 9) of the current frame and downlink sub-frame 0 (or 5) of the next frame.

Compared with the solution of parallel uplink and downlink processing, the advantages of the method according to the present disclosure are as follows.

The solution of parallel processing of the uplink and downlink sub-frames must meet:

$$\begin{cases} x \le 1.0 \text{ ms} \\ y \le 1.0 \text{ ms}; \end{cases}$$

and the solution of serial processing of the uplink and downlink sub-frames must meet:

$$\begin{cases} 3x + 2y + T_{L2} \le 5.0 \text{ ms} \\ 2x + y \le 4 - 2T_a - T_d. \end{cases}$$

According to the two equations above, it seems that the parallel processing could give more abundant processing time. However, the parallel processing requires parallel operation of two processors, while the serial processing solution only requires one processor. Therefore, it is obvious that the serial processing solution is more advantageous. Specifically speaking:

assume that the channel transmission delay $T_a$=0.2 ms, delay in initiating baseband sub-frame processing $T_d$=1.0 ms, time reserved for MAC layer processing $T_{L2}$=1.0 ms, and then:

in the solution of parallel processing of the uplink and downlink sub-frames, let $$\begin{cases} x = 1.0 \text{ ms} \\ y = 1.0 \text{ ms}; \end{cases}$$

in the solution of serial processing of the uplink and downlink sub-frames, assume that y=1.0 ms, and then $$\begin{cases} 3x + 2y + T_{L2} \le 5.0 \text{ ms} \\ 2x + y \le 4 - 2T_a - T_d \end{cases} \Rightarrow \begin{cases} 3x + 2y \le 4.0 \text{ ms} \\ 2x + y \le 2.6 \text{ ms} \end{cases} \Rightarrow \begin{cases} y = 1.0 \text{ ms} \\ x = 0.8 \text{ ms.} \end{cases}$$

As the solution of serial processing of the uplink and downlink sub-frames only requires one processor, while the parallel processing solution requires two processors, the solution of serial processing of the uplink and downlink sub-frames according to the present disclosure is more advantageous and obtains more abundant processing time. In other words, only a lower speed is required for the baseband processor, thus reducing the idle rate of the baseband processor and improving the resource utilization of the processor.

With respect to the method according to the present disclosure, an apparatus for processing baseband uplink and downlink sub-frames is further provided. The apparatus according to the present disclosure may be set at the base station side and includes at least a serial processing module configured to serially process uplink and downlink sub-frames, wherein a length of time slots for processing each sub-frame meets the requirement of formula (3). The serial processing module is further configured to perform serial processing according to the following order in processing the uplink and downlink sub-frames: a sub-frame 2 of a current frame, a sub-frame 3 of the current frame, a sub-frame 6 of the current frame, a sub-frame 4 of the current frame, a sub-frame 0 of a next frame, a sub-frame 7 of the current frame, a sub-frame 8 of the current frame, a sub-frame 1 of the next frame, a sub-frame 9 of the current frame, and a sub-frame 5 of the next frame, wherein a reserved time slot with a length of at least $T_{L2}$ is inserted between uplink sub-frame 4 (or 9) of the current frame and downlink sub-frame 0 (or 5) of the next frame.

What described are merely preferred embodiments of the present disclosure and are not intended to limit the scope of the present disclosure. Any modifications, equivalent replacements and improvements within the spirit and principle of the present disclosure should be contained in the protection scope of the present disclosure.

The invention claimed is:

1. A method for processing baseband uplink and downlink sub-frames, comprising: at a base station of a Long Term Evolution-Time Division Duplex (LTE-TDD) system, receiving, by a receiving antenna of the base station, uplink sub-frames 2, 3, 4, 7, 8, and 9;

transferring, by the receiving antenna, the received uplink sub-frames to a baseband processor of the base station;

processing, by the baseband processor, the uplink sub-frames transferred by the receiving antenna;

processing, by the baseband processor, downlink sub-frames 0, 1, 5, and 6;

transferring, by the baseband processor, the processed downlink sub-frames to a transmitting antenna; and transmitting, by the transmitting antenna, the downlink sub-frames transferred by the baseband processor, wherein the baseband processor processes the uplink sub-frames and the downlink sub-frames serially in an order of a sub-frame 2 of a current frame, a sub-frame 3 of the current frame, a sub-frame 6 of the current frame, a sub-frame 4 of the current frame, a sub-frame 0 of a next frame, a sub-frame 7 of the current frame, a sub-frame 8 of the current frame, a sub-frame 1 of the next frame, a sub-frame 9 of the current frame, and a sub-frame 5 of the next frame, wherein information solved from the uplink sub-frame 2 of the current frame is to be sent back to a downlink channel at the downlink sub-frame 6 of the current frame, information solved from the uplink sub-frames 3 and 4 of the current frame is to be sent back to the downlink channel at the downlink sub-frame 0 of the next frame, information solved from the uplink sub-frame 7 of the current frame is to be sent back to the downlink channel at the downlink sub-frame 1 of the next frame, information solved from the uplink sub-frames 8 and 9 of the current frame is to be sent back to the downlink channel at the downlink sub-frame 5 of the next frame;

wherein a length of time slots for processing each sub-frame meets formulae $$\begin{cases} 3x + 2y + T_{L2} \le 5.0 \text{ ms} \\ 2x + y \le 4 - 2T_a - T_d, \end{cases}$$

wherein $T_a$ is a delay in transmission from the receiving antenna to the baseband processor as well as a delay in transmission from the baseband processor to the transmitting antenna, $T_d$ is a delay in initiating baseband sub-frame processing, $T_{L2}$ is a time reserved for MAC layer processing, x represents an allowable length of time slots for processing an uplink sub-frame, and y represents an allowable length of time slots for processing a downlink sub-frame.

2. The method for processing baseband uplink and downlink sub-frames according to claim 1, wherein a reserved time slot with a length of at least $T_{L2}$ is inserted between the sub-frame 4 of the current frame and the sub-frame 0 of the next frame, and the reserved time slot with a length of at least $T_{L2}$ is inserted between the sub-frame 9 of the current frame and the sub-frame 5 of the next frame.

3. The method for processing baseband uplink and downlink sub-frames according to claim 2,
the sub-frame 1 and the sub-frame 6 are special sub-frames.

4. A baseband processor at a base station of a Long Term Evolution-Time Division Duplex (LTE-TDD) system, comprising at least a serial processing module configured to:
receive uplink sub-frames 2, 3, 4, 7, 8, and 9 transferred by a receiving antenna of the base station;
processing the received uplink sub-frames;
processing downlink sub-frames 0, 1, 5, and 6;
transferring the processed downlink sub-frames to a transmitting antenna;
wherein the baseband processor processes the uplink sub-frames and the downlink sub-frames serially in an order of a sub-frame 2 of a current frame, a sub-frame 3 of the current frame, a sub-frame 6 of the current frame, a sub-frame 4 of the current frame, a sub-frame 0 of a next frame, a sub-frame 7 of the current frame, a sub-frame 8 of the current frame, a sub-frame 1 of the next frame, a sub-frame 9 of the current frame, and a sub-frame 5 of the next frame,
wherein information solved from the uplink sub-frame 2 of the current frame is to be sent back to a downlink channel at the downlink sub-frame 6 of the current frame, information solved from the uplink sub-frames 3 and 4 of the current frame is to be sent back to the downlink channel at the downlink sub-frame 0 of the next frame, information solved from the uplink sub-frame 7 of the current frame is to be sent back to the downlink channel at the downlink sub-frame 1 of the next frame, information solved from the uplink sub-frames 8 and 9 of the current frame is to be sent back to the downlink channel at the downlink sub-frame 5 of the next frame;
wherein a length of time slots for processing each sub-frame meets formulae $$\begin{cases} 3x + 2y + T_{L2} \le 5.0 \text{ ms} \\ 2x + y \le 4 - 2T_a - T_d, \end{cases}$$

wherein $T_a$ is a delay in transmission from the receiving antenna to the baseband processor as well as a delay in transmission from the baseband processor to the transmitting antenna, $T_d$ is a delay in initiating baseband sub-frame processing, $T_{L2}$ is a time reserved for MAC layer processing, x represents an allowable length of time slots for processing an uplink sub-frame, and y represents an allowable length of time slots for processing a downlink sub-frame.

5. The apparatus for processing baseband uplink and downlink sub-frames according to claim 4,
wherein a reserved time slot with a length of at least $T_{L2}$ is inserted between an uplink sub-frame 4 of the current frame and a downlink sub-frame 0 of the next frame, and the reserved time slot with a length of at least $T_{L2}$ is inserted between an uplink sub-frame 9 of the current frame and a downlink sub-frame 5 of the next frame.

* * * * *